「United States Patent [19]」

Hedberg et al.

[11] 4,435,734
[45] Mar. 6, 1984

[54] FM VIDEO RECORDING AND REPRODUCING SYSTEM

[75] Inventors: David J. Hedberg, Ranchos Palos Verdes; C. Gary Nilsson, Redondo Beach, both of Calif.

[73] Assignee: VAS Corporation, Torrance, Calif.

[21] Appl. No.: 320,620

[22] Filed: Nov. 12, 1981

[51] Int. Cl.³ .................... H04N 5/91; H04N 9/491; H04N 5/76; G11B 5/04
[52] U.S. Cl. .................... 358/335; 358/330; 358/342; 358/340; 360/30; 360/20; 332/14
[58] Field of Search .................... 360/28–30, 360/20; 358/330, 335, 340, 342, 186; 332/14

[56] References Cited

U.S. PATENT DOCUMENTS

| | | | |
|---|---|---|---|
| 3,423,540 | 1/1969 | Wortzman | 360/30 |
| 3,783,410 | 1/1974 | Bruck | 332/14 X |
| 3,811,097 | 5/1974 | Dijkmans | 332/14 |
| 4,052,740 | 10/1977 | Coleman, Jr. | 360/30 |
| 4,225,873 | 9/1980 | Winslow | 358/342 |

Primary Examiner—Aristotelis M. Psitos
Attorney, Agent, or Firm—Robert B. Block

[57] ABSTRACT

High resolution video signals of bandwidth up to 25 mHz are recorded magnetically or optically, or are transmitted on a communications channel carrier with superior fidelity by using novel electronic circuit system including implementations of an FM modulator, writing amplifier, and wideband discriminator which enable coding and decoding with high accuracy, low noise, and low interference. The video signals are used to directly modulate a square wave carrier using an FM technique employing a very low center frequency-to-bandwidth ratio without need for subsequent frequency translations. A writing amplifier provides gain needed for saturated recording with unique provisions to balance transition amplitudes for minimum second harmonic distortion without affecting the primary phasing of transitions. A novel multiwinding inductor and pulse discriminator implementation is capable of demodulating the very wide deviation FM signal with good cancellation of the second harmonic and fundamental FM carrier spectrums. Novel electronic circuit techniques are disclosed to provide high levels of performance with simple implementations of the electronic hardware.

4 Claims, 27 Drawing Figures

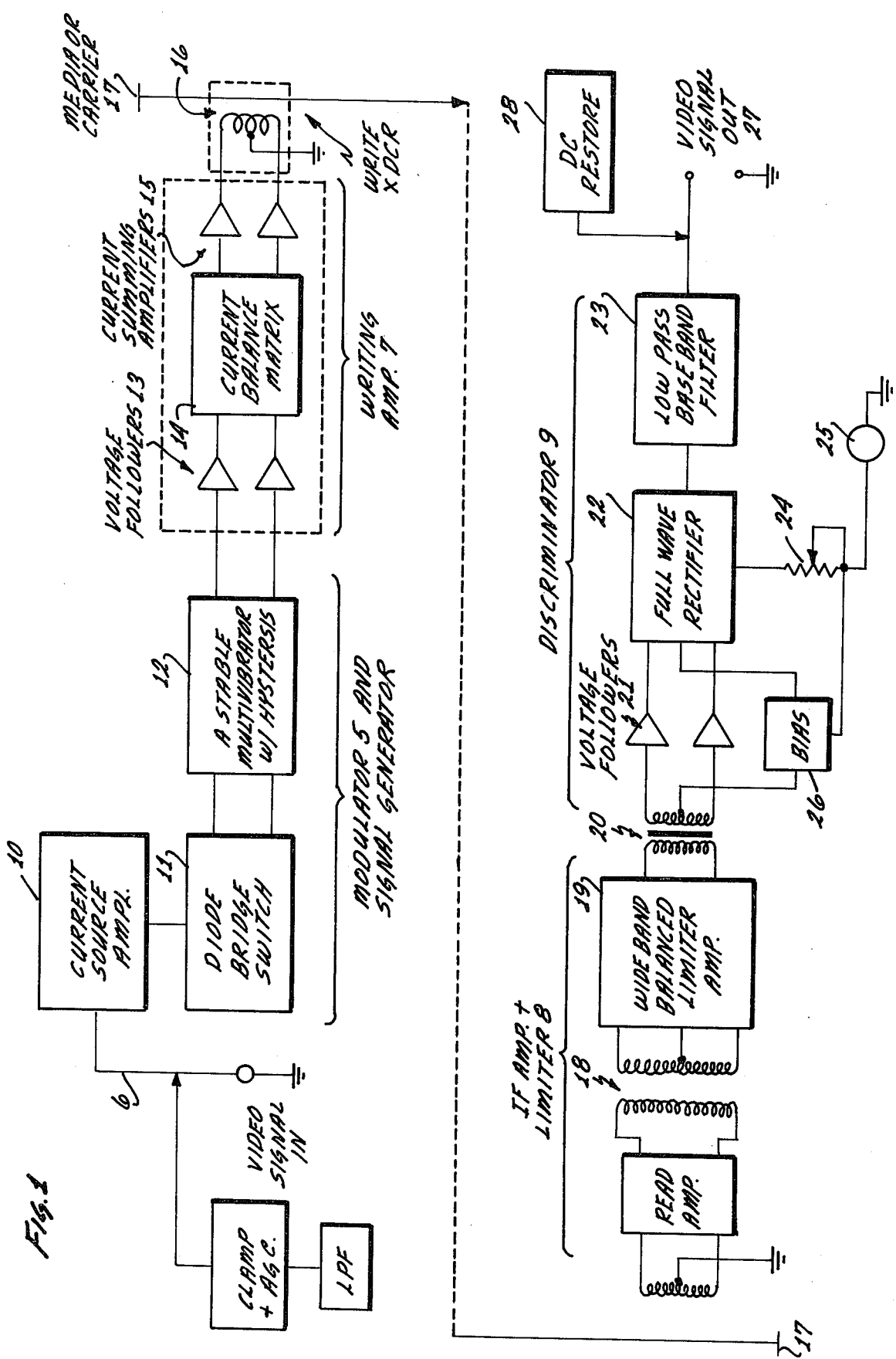

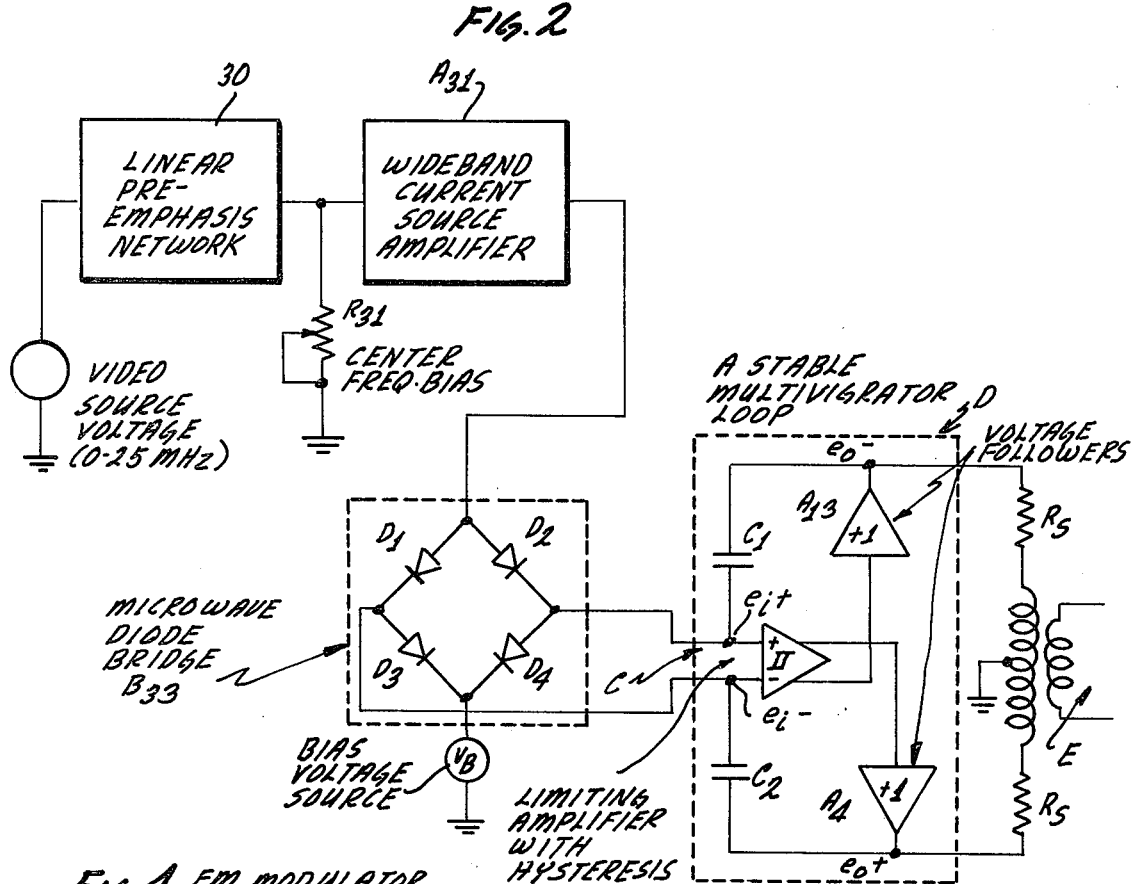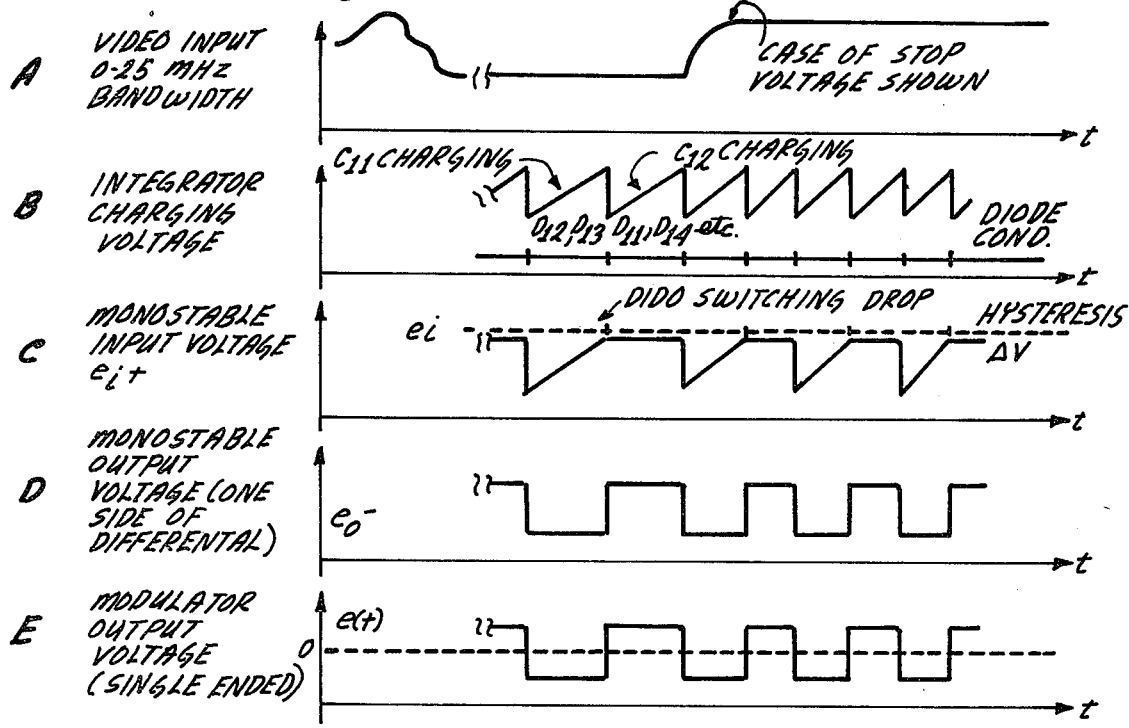

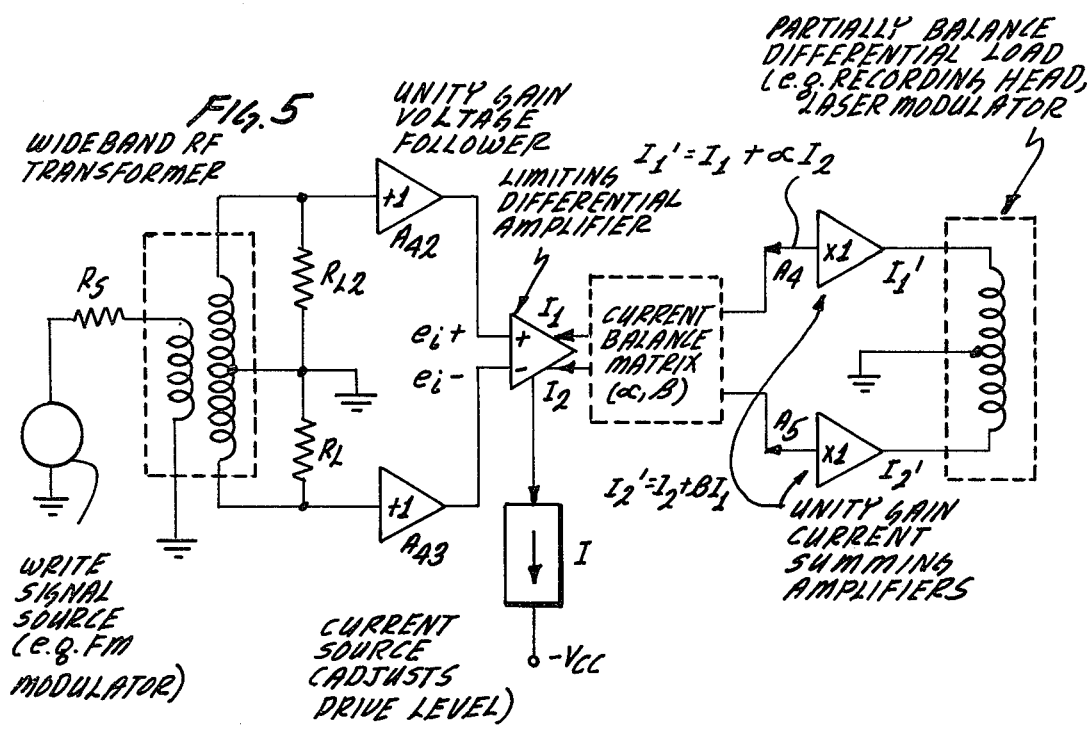
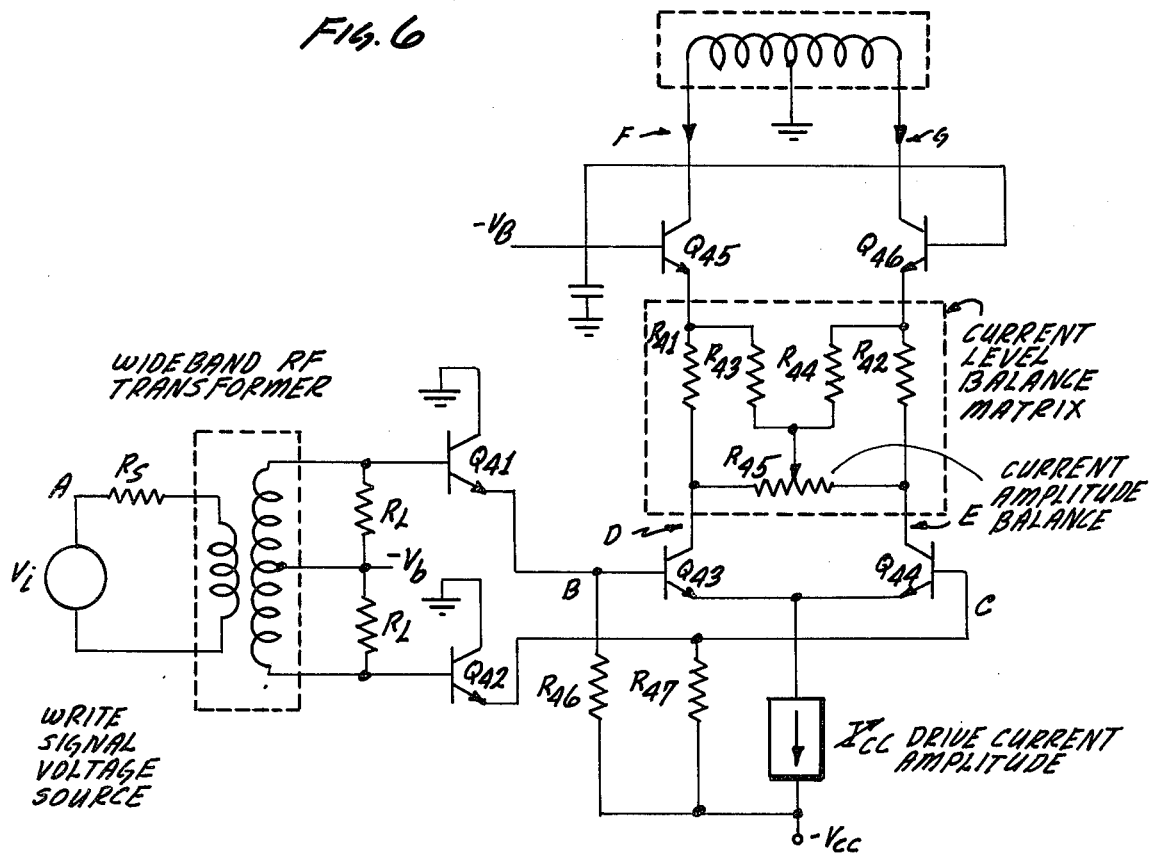

FIG. 7A
PHASING CONTROL
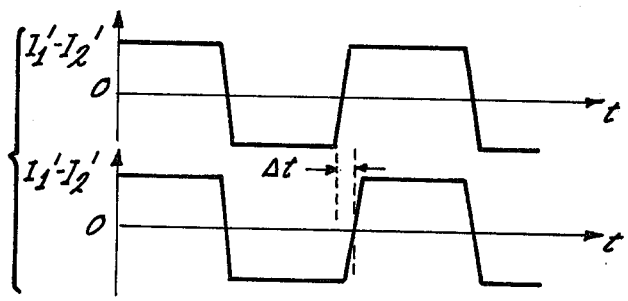
FIG. 7B
AMPLITUDE CONTROL
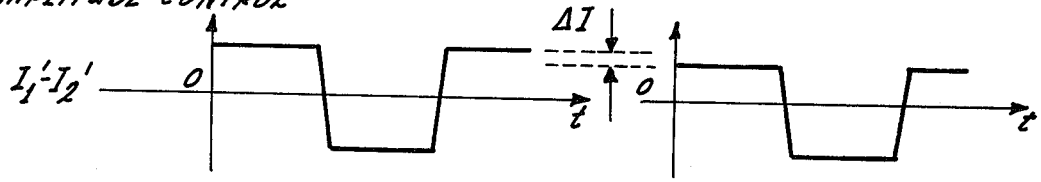
FIG. 8
(A) WRITE SIGNAL SOURCE VOLTAGE (Fm) $V_i$
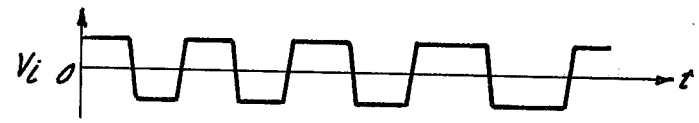
(B) LIMITING AMP. INPUT VOLTAGE $e_i^+$
(C) LIMITING AMP. INPUT VOLTAGE $e_i^-$
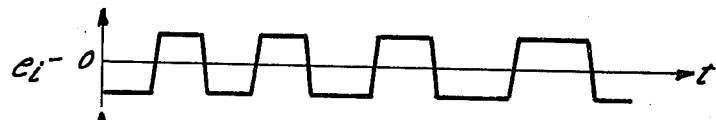
(D) LIMITING AMP. OUTPUT CURRENT, $I_1$
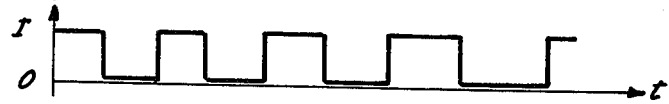
(E) LIMITING AMP. OUTPUT CURRENT, $I_2$
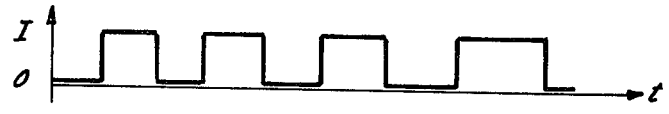
(F) OUTPUT CURRENT $I_1'$
(G) OUTPUT CURRENT $I_2'$
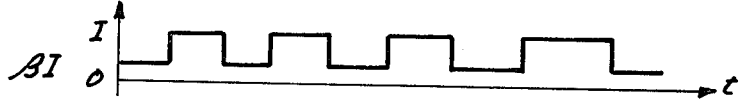

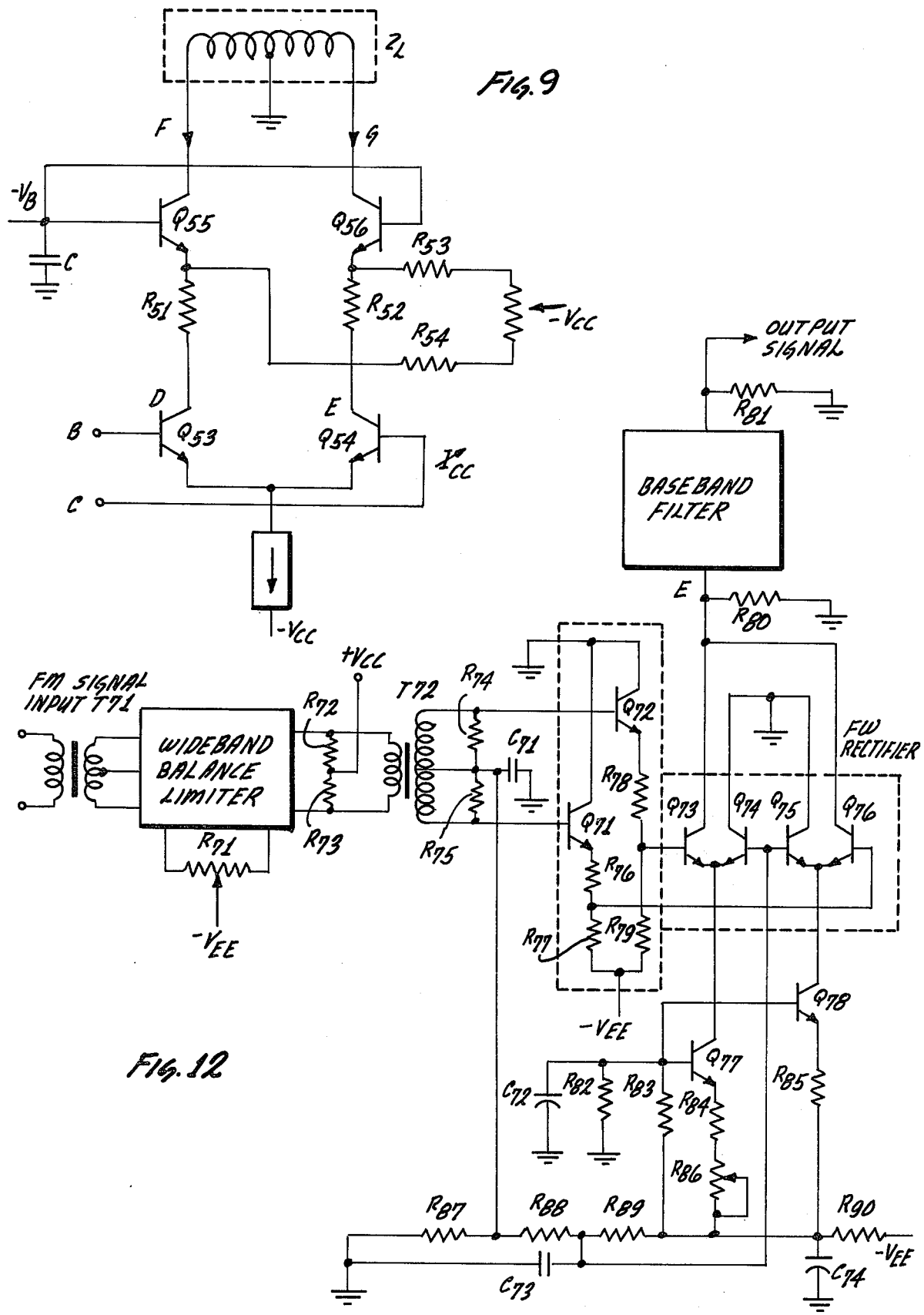

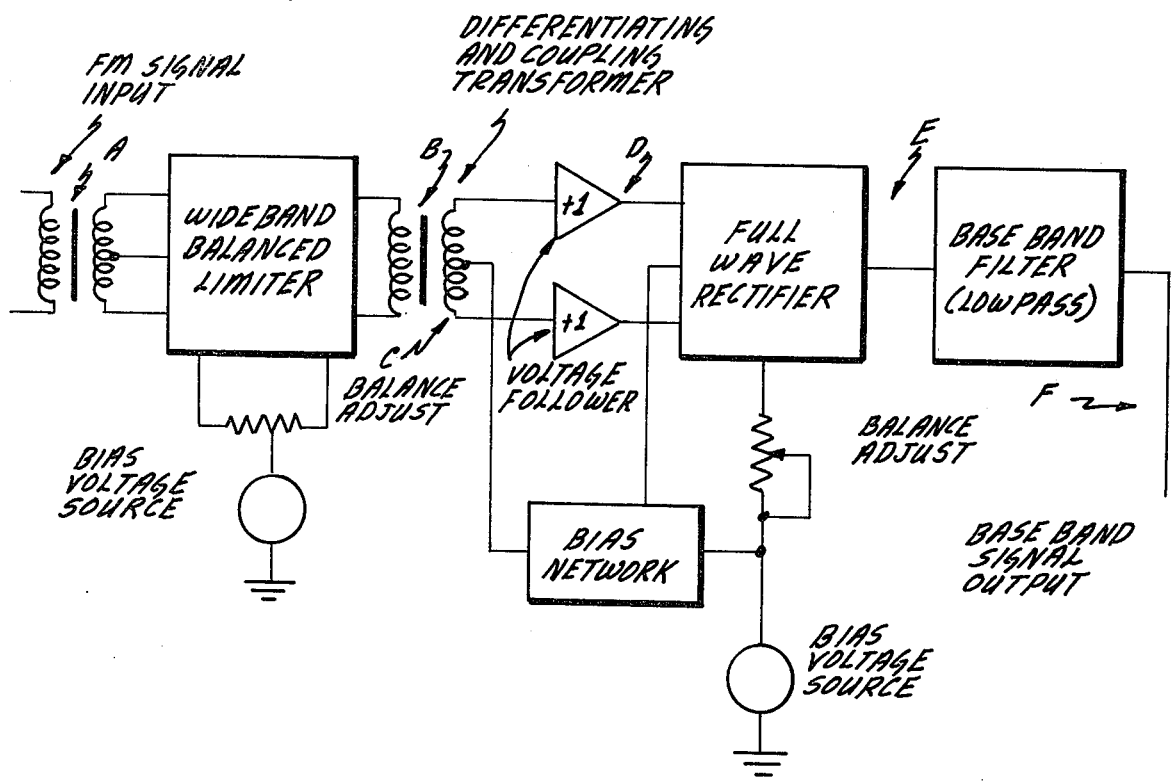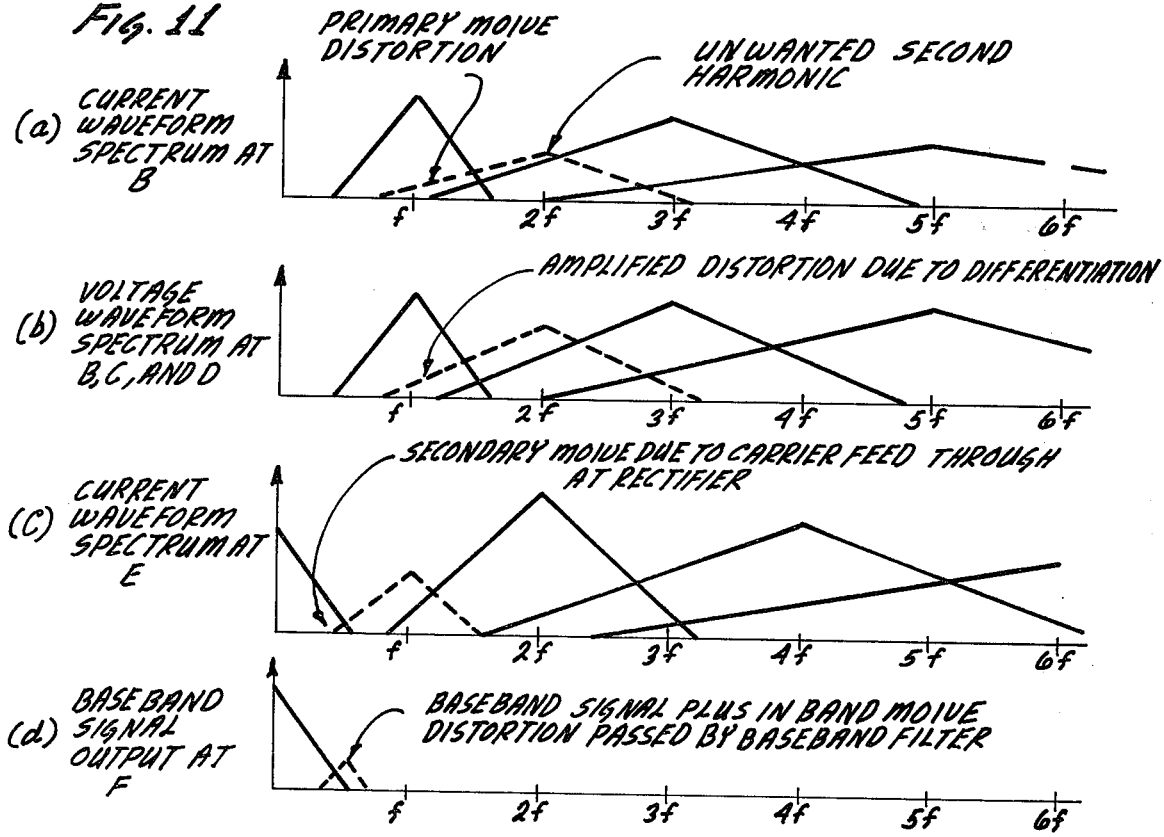

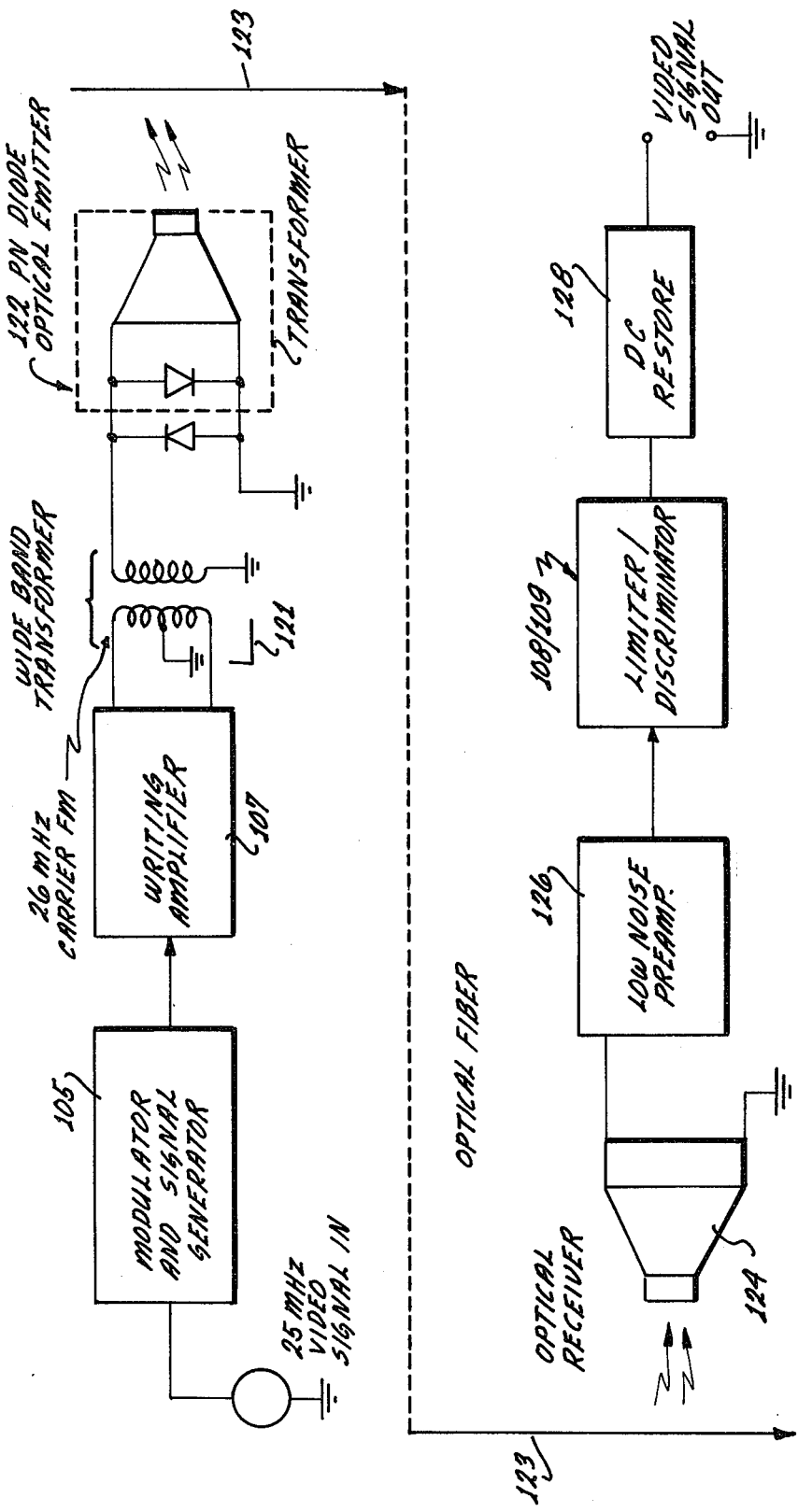
FIG. 13 FIBER OPTIC HIGH RESOLUTION VIDEO TRANSMISSION SYSTEM

FM VIDEO RECORDING AND REPRODUCING SYSTEM

BACKGROUND OF THE INVENTION

This invention relates to video signal transmission and recording and more particularly to video signal processing, encoding, and decoding systems for video recording. The system includes a novel wide band FM modulator, writing amplifier, and wide-band demodulating circuits and discloses novel electronic circuit implementations of the same using discrete components. The system finds special application to video disc and tape recording, to video recording using a modulated laser beam, as well as to applications in communications systems using an electromagnetic wave carrier.

Many systems have been proposed for the recording of video signals the most familiar application of which is the relatively permanent recording and replay of video and audio TV signals. Also known are various high resolution T.V. systems such as in the fields of medical and industrial video recording. Such systems employ as much as 1,225 line resolution, both vertical and horizontal, and are capable of at least 10 mHz bandwidth video and up to 25 mHz video. The present invention is directly applicable to such systems where the recording media or system can handle such bandwidths.

In the transmission of high resolution television signals, existing commercial broadcast technology requires that the initial video signal, which may be from DC to 25 mHz in bandwidth, be separated and compressed as an AM video signal and FM audio signal on a 6 mHz wide bandwidth (in the United States). Other limitations are presented by the bandwidth characteristics of media used for recording a signal. Typical media include the wellknown magnetic tape consisting of a particulate magnetically impressible material disposed on a plastic strip, a film in which an intermittent motion film may be scanned by a flying spot scanner, an electron beam recorded film digitally encoded films, and laser beam scanned optical systems. Also known are holograms which operate in playback only, being originally recorded by laser beam as a surface deformation on a plastic film.

At the present time, cassette video recorders have become popular utilizing magnetic tape cassettes in which the medium is a typical magnetic tape which is transversely scanned by a system of rotating heads to establish a sufficient head to tape writing speed as to permit a wide frequency band recording. Various electronic systems have been devised for handling the problem of reducing a video signal and audio signal into a form which is capable of being impressed upon the recording media. Typically the bandwidths to which compression is taken have been as low as 1½ to 2 mHz and FM conversion systems have had to be employed. Since the initial bandwidth of a full high resolution video signal of typical form can be as much as 25 mHz any compression of this bandwidth will result in loss in video fidelity. Even so, with limited bandwidth, in order to record a typical NTSC video signal, i.e., as high as 6 mHz, requires the video tape to move at 6 linear meters a second or faster, and, even at that speed, the wavelengths of the magnetic fields recorded on the tape are so short that submicrometer head gaps are required, and head to tape spacing must be made critically small. In consumer video tape recording such linear speeds consume too much tape so that helical scan systems have been developed in which the tape spirals around a revolving drum to which the tape heads are mounted. This allows a tape head traversing a circular path with the same radius as the drum to scan diagonal tracks on the tape at a speed high enough to record such a video signal. Even so, consumer VTR's are not capable of direct recording of a composite video signal and color subcarrier. These are, therefore, disassembled into a baseband luminance signal and a subcarrier chrominiance signal before being recorded. Even so, a nearly 17 octave frequency range is required to capture the entire luminance signal. This is usually solved by employing narrow band FM techniques. Numerous problems are encountered with these systems. There is a need, therefore, for a new and improved system for signal processing of high resolution composite video signals which will enable the same to be recorded without extensive signal modification and with greater fidelity.

In certain high resolution systems, the foregoing limitations in actual recording are overcome using magnetic disc recording of much higher bandwidth. The discs may be in the form of metal film plated on the plastic substrate disc. Other industrial video systems are known having at least 10 mHz bandwidth and several development systems are proposed having bandwidths up to 25 mHz including proposals for video signal transmission by satellite. In such applications there is a need for a wideband, high resolution signal processing system having commensurate capabilities. In general, the capability which is sought is to provide high resolution television viewing having 35 mm film quality and projectable on large screen. For the present, a 10 mHz bandwidth is the usual limitation and is imposed primarily by the magnetic media characteristics that are used in conventional technology. If, as will occur, the media magnetic characteristics are improved, then the electronics disclosed herein will be capable of operating at the new higher bandwidths without conceptual or configural changes.

SUMMARY OF THE INVENTION AND OBJECTS

In general, the FM video recording system of the present invention is predicated upon the realization that a video signal can be used to FM modulate a square wave carrier at a predetermined frequency or repetition rate without further frequency conversion and that the resultant bi-level FM signal, when amplified and processed, can be directly used to write on magnetic disc or tape at saturation levels. Hereinafter, the term "tape" will be used to include both tape and disc, unless otherwise indicated expressly or by context. The signal can easily be recovered from the tape and demodulated to recover the video signal. By way of example, a typical video signal bandwidth from about DC to 25 mHz can be converted in this way to a bi-level FM signal from 1 to 51 mHz comprising an FM modulated square wave signal having a center frequency of 26 mHz. The signal can then be amplified sufficiently to saturate a tape onto which it is impressed, the system being designed to preserve a high phase (i.e., zero crossing) accuracy. The video signal is recovered from the tape by converting the same into an electrical signal generated by sensing the tape with a magnetic head and converting or demodulating the same to the video signal using a differentiating detector or discriminator.

Thus, the video recording system of the present invention is based upon the ability to convert the video signal into an FM signal in which the modulation is sufficiently wide to carry the entire signal information of the original. Since this is greater than either recording systems or transmission systems can usually accommodate, it will be understood that various modifications and adaptions of the disclosed system would be contemplated in order to adapt the same or limit the same to specific recording media or carriers. Additionally while the invention is disclosed with respect to a recording system, it should be appreciated that the recording media serves as a permanent form of carrier so that the electronic signal processing system disclosed herein should also be considered applicable both to a recording system in which a permanently inscribable media is employed and to communications systems in which a carrier is transmitted. Thus "recording" as used herein is meant to encompass both the concepts of a modulated signal carrier as well as a tape or optical media for retaining the signal.

In general, the invention proposes the single conversion of the video signal including luminance, chrominance and audio into a wideband, low carrier frequency FM signal. The parameters of this signal are carefully controlled so as to preserve all phase and timing information required for fidelity. A novel writing amplifier is disclosed which employs a means for obtaining an adjustable current balance while maintaining accurate signal phase and which operates while keeping the second harmonic distortion sufficiently low as to minimize unwanted Moire distortion. The signal is recovered using a wide band balanced FM discriminator.

Any of several mentioned recording systems may be utilized with the circuitry of the present invention. For purposes of illustration, however, it will be assumed that an extremely high fidelity magnetic disc or tape recording system is employed in which the writing speed, the head gap, the head design, and the entire operating mechanism is constructed and arranged for optimum results without regard to cost. In addition, it will be assumed that in tape recording a linear tape recording would be made so as to eliminate the need for consideration of incorporating synching, blanking and other characteristics solely for the purpose of accommodating any particular type of tape recording or viewing. It should be understood that if the video signal contains such information for other purposes, as in operating a conventional raster scan TV monitor, that such information is includable with and considered to be part of the video signal.

In addition, it may be assumed that the video signal to be recorded may be of any character; that is to say, it may be a conventional baseband luminance signal having a 17 octave bandwidth typically employed in TV video work, or it may be the entire video signal before disassembly into luminance, chrominance and audio. The components of the electronic signal handling system of the present invention will now be discussed in connection with further details of the FM modulator, the signal writing amplifier and the FM discriminator disclosed. While each of these components has been optimally designed to work in cooperation with the others in connection with the system of the present invention, it will be seen that each is also capable of an independent contribution providing improved performance in systems of this type. Accordingly an analysis will be given of each of the problems presented and the design considerations and contribution made by each of these subsystems.

In general, the video recording system of this invention includes a source of video signal, a recording medium (or carrier), and means for impressing a recoverable signal on the medium in which the improvement relates to improved signal processing circuits. These circuits include a modulator for converting the video signal into a wideband FM signal centered about a low frequency, a writing amplifier for amplifying the FM signal and for driving the impressing means, and a demodulator for receiving the signal recovered from the recording medium and for converting it back to a video signal corresponding to the original.

The modulator includes an astable multivibrator for generating the square wave signal at a predetermined frequency and for shifting the frequency in response to an applied video signal to vary the repetition rate and pulse width as an FM variation corresponding to the video signal. The writing amplifier provides a suitable signal strength for recording the FM square wave signal and impressing the same on a simple medium such as magnetic tape to preferably saturate the same. The playback system includes a pickup for sensing variations in the medium and for generating corresponding FM electrical signal which is then demodulated to recover the video signal. All information contained in the FM square wave signal is contained in the phase thereof by its zero crossings and is solely both FM and analog in nature, although the signals alternate between only two amplitude states. Accordingly, the modulator, writing amplifier, and demodulator are analog in operation. Furthermore, the recording medium or carrier need not be linear but need only possess saturable digital recording capability.

FM MODULATOR

In FM recording system applications it is necessary and desirable to modulate with as low a carrier frequency as possible in order to achieve maximum recorded band widths. The upper limit is set by considerations of the recording medium, the recording instrumentality and its arrangements. More specifically in video tape recording the band widths are set by considerations of the limits of recordability of magnetic tape, the tape head gap width and the recording format. Thus, the design requirements of the FM modulator are extremely demanding in the following areas.

A. At low carrier to deviation bandwidth ratios, the modulator must deviate in frequency over several octaves of bandwidth. For example, for 25 mHz baseband input bandwidth and modulation index near one, the peak deviation limits for a 26 mHz center frequency are from 1 mHz to 51 mHz.

B. The second harmonic distortion level of the modulator output must remain low over the entire deviation frequency range in order to minimize unwanted Moire frequency components and modulation spectral leakage into the demodulated baseband signal. Levels below −50 dBc are typically required for optimum performance.

C. The feedthru of input baseband signal to modulated output signal must remain very low to avoid undesired harmonic distortion in the demodulated output. Levels below −50 dBc are typically required for optimum performance.

D. The initial and long term frequency stability of the modulator carrier frequency must be adequate to avoid overmodulation at the lower frequency limit of the recording or transmission system. Stabilities of ±5% or better are typically required.

Heretofore, implementation of the FM modulator has usually been by one of two methods.

i. Beat frequency reactance oscillator; usually implemented with two very high frequency oscillators deviated out of phase in order to obtain maximum linear deviation range.

ii. Astable multivibrator modulator using a signal driven current source to modulate the switching frequency.

The implementation disclosed herein, while in effect a form of astable multivibrator, provides fundamental performance improvements not possible with either conventional approach.

An ideal FM modulator produces the modulated signal $$e(t) = A_c \cos[w_c t + \phi_c + \psi(t)]$$

where $$\psi(t) = m_f \int_0^t g(\ )d$$

The function $g(.)$ is the baseband input signal (referred to here as "video"). For a switching modulator, the integral in (1) can be thought of as a summation of integrals, $$\int_{t_a}^{t_b} g(\tau)d\tau,$$

over the time intervals where the modulator output is constant, i.e., where $t_a$ and $t_b$ are the output switching times for a "fast" multivibrator. Clearly, for the case of the described application where the carrier to peak deviation frequency ratio is low and modulation index approaches unity, it is very important that the phase variation for each half cycle of the modulated carrier be dependent only on the integral of the input during that half cycle. It is also important that the whole interval be active integration time, that is, with a minimum of signal integration loss due to switching.

It is a general object of the present invention to provide an FM modulator which will provide the foregoing functional features while also meeting the design requirements of A through D above.

The modulator is of the astable multivibrator type having a central frequency controlled by wide band transconductance amplifier which converts the input video signal into a current signal. The current signal input into the multivibrator is by way of a differential current splitter having a nano second switching response time. The multivibrator incorporates a hysteresis control to reduce crossover conductance and eliminate dead time between conductance states of the signal splitter, the latter being implemented in practice by a high speed diode bridge.

WRITING AMPLIFIER

Since, in the FM recording system or low frequency communication system application, the modulated spectrum is at low frequency and the frequency deviation is very wide, the requirements on the writing amplifier are extremely demanding in these two areas:

A. The switching times (or equivalently, zero crossing phase) of the output signal must be accurately maintained with respect to the input signal from the modulator over the full deviation range of the FM signal (e.g., from 1 mHz to 51 mHz in the previous example cited for the FM modulator). Phase accuracies of better than one nanosecond are typically required for optimum performance at the cited bandwidth of 25 mHz.

B. The second harmonic distortion of the entire writing system (amplifier and medium) must remain low over the full frequency deviation range in order to minimize unwanted Moire frequency components and modulation spectral leakage into the demodulated baseband signal.

Conventional writing amplifiers employ a balance control which typically varies the drive signal balance of a differential configuration in order to permit the nulling of second harmonic distortion at a given frequency. The writing amplifier invention disclosed herein allows independent optimization of the amplifier switching phasing and amplitude balance while retaining inherently high switching speed performance. Thus, the second harmonic distortion can be nulled over octaves of deviation bandwidth simultaneously. The result is a fundamental performance improvement not possible with conventional circuit approaches.

In the saturated recording system application, the writing amplifier is required to provide the necessary saturated amplification and power gain to drive the writing transducer which in turn produces recorded transitions phased identically with the zero crossings of the FM input signal. The transducer may be a single ended or a balanced differential load on the driver. In the case of wideband magnetic recording, as described here, it is advantageous to use a bifilar wound (differential) recording head for reasons of reduced load inductance and greater rejection of common mode pickup during playback. However, the bifilar head is not ideally balanced due to inductance and coupling efficiency differences in the two windings. Also, due to finite media film thickness and the slight geometrical asymmetry of the head/disc interface, there is a small amount of inherent magnetic amplitude asymmetry which requires compensation. Therefore, an amplitude balance adjustment in the driver is necessary in order to meet the second harmonic distortion criterion in B over a wide bandwidth as in criterion A.

The phase accuracy of the recorded transitions is significantly affected by the rise and fall time of the transducer response, the shape of the transducer waveform, and any amplitude modulation which is present as the writing transducer signal interfaces to the media. Therefore, it is desirable for the writing amplifier to perform limiting and to produce a symmetrical waveform with minimum rise and fall times. The output drive amplitude must be sufficient to saturate the media on a relative "steep" portion of the drive waveform in order to minimize any unsymmetrical AM to PM modulation effects.

The disclosed configuration is a novel approach to meeting the above desirable requirements:

i. Accurate phasing over a wide bandwidth (less than 1 nanosecond error can be achieved).

ii. Amplitude balance control and phasing are independently provided.

iii. Maximum output rise and fall times.

iv. High amount of symmetrical amplitude limiting.

Moreover, the configuration is implementable in discrete, hybrid, or monolithic integrated circuit form with a small number of high frequency RF transistors. Since the configuration is fully differential through all signal amplifying stages, the second harmonic distortion level is significantly reduced through cancellation of even distortion products. The differential current source output is ideally suited for driving a bifilar magnetic head transducer or a high impedance (e.g., 300 ohm) optical modulator.

The writing amplifier serves as a power source for boosting and impressing a recordable signal on the media at saturation levels. As such it need operate only to supply an accurate bi-level signal having high power and phasing accuracy. It is implemented with a limiting differential amplifier drivable to full clipping and having an output taken through an adjustable current balance matrix to accurately adjust the zero crossing or phase. A current summing amplifier receives the current balance matrix output and develops a symmetrical bipolar signal across the writing amplifier load, commonly a magnetic record head.

WIDEBAND BALANCED FM DISCRIMINATOR

In a wideband FM recording system where system limitations demand a carrier with as low a frequency as possible, the design requirements of the FM demodulator are extremely demanding in the following areas:

A. At low carrier frequency to deviation bandwidth ratios, the discriminator may be required to have a linear transfer function over several octaves of bandwidth.

B. The second harmonic distortion level of the discriminator must remain very low over the entire deviation frequency range in order to minimize unwanted Moire distortion in the demodulated baseband signal. Moire distortion that originates when the second harmonic spectrum spills into the fundamental modulation spectrum will be referred to as primary Moire distortion in the following discussion of the wideband discriminator circuit.

C. The carrier suppression capability of the discriminator must typically exceed 50 dBc in order to minimize Moire distortion introduced when carrier sideband components spill into the demodulated baseband spectrum. Moire distortion introduced by this mechanism will be referred to as secondary Moire distortion.

The conventional implementation of FM demodulation has used the phase-shift discriminator circuit commonly found in FM broadcast radio and television receivers. In this circuit, frequency modulated information is transformed into phase modulation by a linear phase-shift circuit. A phase detector circuit then converts the phase modulation to amplitude modulation, completing the demodulation process. This circuit performs well in applications where the frequency deviation bandwidth to carrier frequency ratio is small. When a wideband signal modulates a relatively low frequency carrier, this type of discriminator circuit cannot be used because it is not possible to construct a phase-shift circuit with adequate linearity over wide bandwidths (e.g., several octaves).

A discriminator circuit which exhibits good linearity over several octaves of bandwidth is known as the differentiating or pulse type discriminator. This circuit has long served as a model for the simplest and most basic FM demodulator but has seldom been used in FM systems due to its very low gain compared to phase-shift discriminators, ratio detectors, and other types of discriminator circuits. Low gain is of no consequence however, in the high deviation, low carrier frequency FM system provided here where wide frequency excursions covering many octaves of bandwidth can still produce a signal of adequate level at the differentiator output. For example, a differentiating discriminator which outputs pulses of 15 nanosecond duration will have a linear operating range extending over four octaves from 2 mHz to 32 mHz.

The operation of the pulse type discriminator is described by the following analysis:

As FM modulated signal can be written in the form:

$$e(t) = A_c \cos[w_c t + \phi_c + m_f \int_0^t g(\tau)d\tau]$$

where $g(.)$ is the baseband input signal. The pulse type discriminator differentiates the modulated signal.

$$\frac{de(t)}{dt} = -A_c[w_c + m_f g(t)]\sin[w_c t + \phi_c + m_f \int_0^t g(\tau)d\tau]$$

The differentiation operation has converted a purely frequency modulated signal to a signal which, in addition to its FM content, has amplitude variations proportional to the baseband signal. The baseband signal can now be recovered by an amplitude detector.

The circuit implementation disclosed herein employs a simple high pass filter followed by a full wave rectifier which together form a wideband balanced pulse type discriminator. Circuit configuration is novel in its usage of a balanced transformer to fill the dual role of differentiating device as well as coupling device. This simple low cost circuit yields excellent performance in terms of linearity and Moire distortion in high deviation, low carrier frequency FM systems.

In a typical system, a 10 mHz baseband signal is employed and is transferred to a carrier at a frequency of 17 mHz to provide a total bandwidth in FM of about 20 mHz and a frequency deviation of from 7 to 27 mHz. Such a signal is entirely suitable for transmission on a dedicated coaxial cable as for example ordinary 75 ohm RG-59 or RG-58 coaxial cable or for recording on metalized discs. Increased bandwidths are not limited by the system disclosed but are limited by the associated recording equipment and may be extended as has been suggested.

These and other features and objects of the invention will become apparent from the following description when taken in conjunction with the accompanying drawings, of which:

BRIEF DESCRIPTION OF THE DRAWINGS

FIG. 1 is a general block diagram of an FM video recording system constructed in accordance with the present invention.

FIG. 2 is a detailed block diagram of the FM modulator section of the video recording system of FIG. 1.

FIGS. 4A through 4E are FM modulator section wave forms resulting from the operation of the modulator of FIG. 3.

FIG. 5 is a detailed block diagram of the write amplifier of FIG. 1.

FIG. 6 is a detailed circuit schematic of the wide band write amplifier constructed in accordance with the invention and FIG. 5.

FIGS. 7A and 7B are the amplitude and phasing control signals of the write amplifier of FIG. 6.

FIGS. 8A through 8G are signal wave forms at various selected points in the write amplifier of FIG. 6.

FIG. 9 is an alternative detailed circuit diagram of a current amplitude balance adjustment system for a write amplifier constructed in accordance with the present invention.

FIG. 10 is a block diagram of the wide band FM discriminator of FIG. 1 and constructed in accordance with the present invention.

FIGS. 11A to 11D illustrates discriminator signal spectra obtained in the operation of the discriminator of FIG. 10.

FIG. 12 is a detailed circuit diagram of a wide band balanced discriminator constructed in accordance with the present invention.

FIG. 13 is a block diagram of a wide band FM video transmission system constructed in accordance with the present invention using optical transmission line techniques with fiber optics.

BRIEF DESCRIPTION OF THE PREFERRED EMBODIMENT

Figure 3:
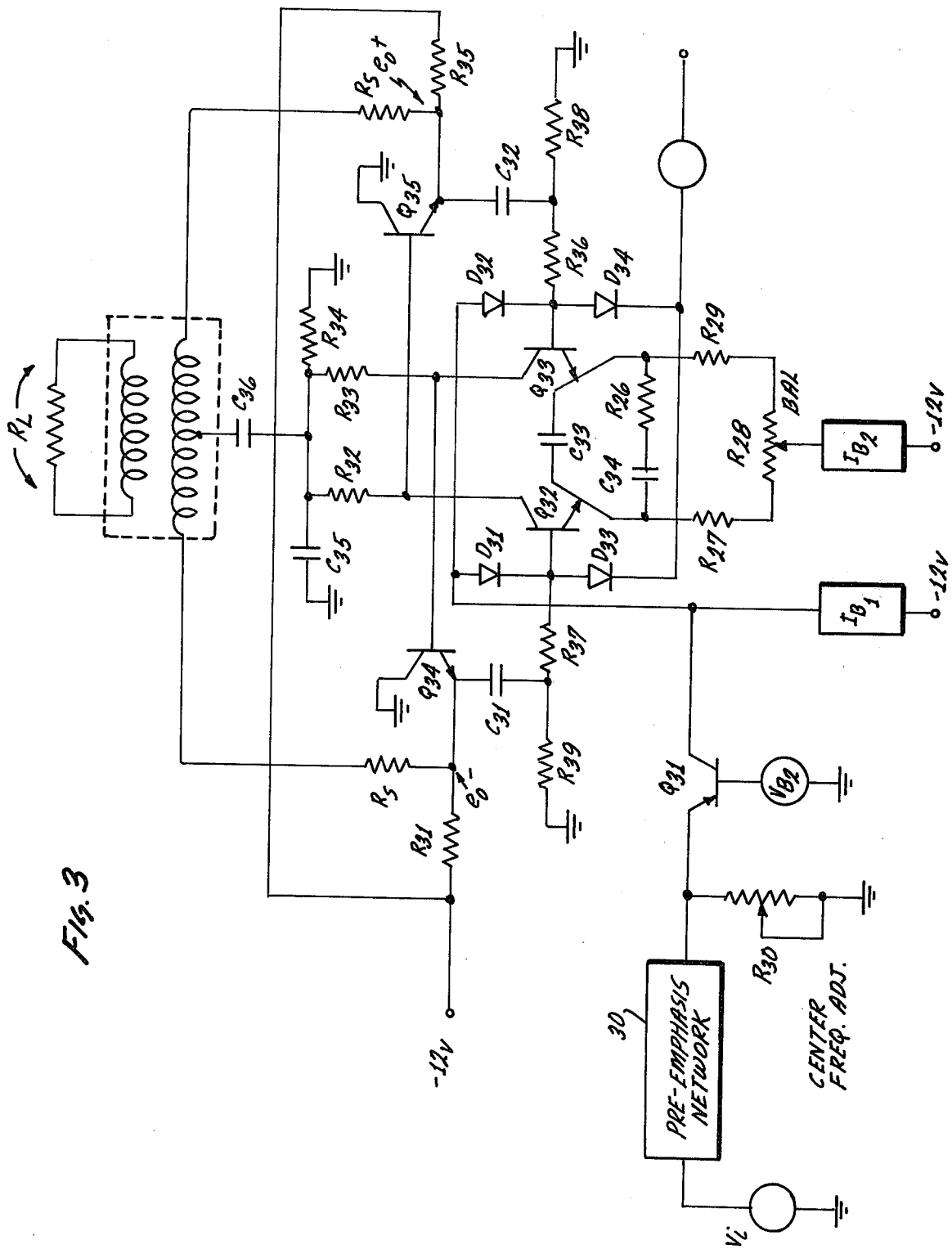
FIG. 3 is a detailed circuit schematic of an FM modulator section of FIG. 2.

The video recording system of the present invention is shown in simplified block diagram form in FIG. 1. Thus, there is provided a modulator 5 which receives the video signal at 6 and includes a current source amplifier which converts it to a current signal which is passed through a microwave diode switching circuit 11. Circuit 11 drives an astable multivibrator 12 having a hysteresis feature as will be described, the output being taken through voltage followers 13 to a current balance matrix 14 which serves as part of the control circuit of a writing amplifier 7 designed to supply limiting saturation current drive to a writing head or record head 16. A magnetic tape, for example, or other suitable recording medium is arranged to pass by the record head and to receive and be impressed with the signal it delivers. It will be understood that the specific media and the arrangement of the recording head are considered to be in accordance with the state of the art and may include for example video cassette written upon by a helically scanned record heads, an optically sensitive material scanned by a laser beam modulated by an optical modulator, or any other known system for accepting a bi-level signal and capable of precisely recording this signal in terms of phase and zero crossing. Accordingly, the particular mechanisms for handling the media or carrier 17, such as the particular tape head mechanisms if relative tape and head movement is desired, and the like, are not detailed and are not required for an understanding of the present invention. Whatever tape or media movement control system is used, the same may be employed to pass the media by a receive head, and a discriminator 9, the output of which will substantially correspond to the FM modulated square wave which has been recorded. This is taken through a wideband limiter 19 to develop a suitable electrical signal of strength form for being passed through a differentiating and coupling transformer 20. The differentiated output of transformer 20 is coupled through voltage followers 21 to a full wave rectifier to create a replica of the original video signal. The limiter 19, differentiating coupling transformer 20, and full wave rectifier 22 are differential push-pull amplifiers in operation and serve to preserve the full signal while simultaneously eliminating second harmonic (Moire) distortion commonly present in such circuits. The output of the full wave rectifier 22 is passed through a low pass band filter 23 to eliminate the carrier and the second harmonic feed through. Bias is controlled by a suitable biasing networks 24, 25 and 26 as will be more fully described. The output video signal is available at 27 and corresponds with high fidelity and accuracy to the video input signal at 6. Frequency pre-emphasis and de-emphasis of the baseband signal is also typically used here but has been omitted from the block diagram for clarity.

MODULATOR 5

Referring to the block diagram of FIG. 2, the modulator input may be considered to be a video voltage signal with bandwidth from DC to 25 mHz. The input bandwidth (with this FM modulator implementation over which accurate modulation is possible) exceeds the known state-of-the-art of approximately 10 mHz. The input signal may be shaped by a pre-emphasis network 30, as shown, before modulation. The pre-emphasized input signal is then converted to a current signal by using a wideband transconductance amplifier A31. The transconductance amplifier can be implemented in discrete or monolithic form with a single grounded base high frequency transistor.

Referring to both FIG. 2 and to the detailed circuit of FIG. 3, the signal integration required for ideal FM modulation is accomplished by integrating the current signal from A31 using capacitors C31 and C32 of equal value and incorporated in the feedback loops of an astable multivibrator formed of a pair of coupled transistors Q32 and Q33 connected in an astable multivibrator configuration and incorporating unity gain voltage followers Q34, Q35 comprising a transistor collector to opposite base feedback loop. The two capacitors integrate the signal on alternate half cycles of the modulated carrier as the astable circuit switches. Rapid switching of the input signal current between the two integrators is accomplished using signal switching bridge 33 of microwave diodes. The diode bridge is capable of switching in a fraction of a nanosecond and is as fast a practical switching device as is available. Thus, the objective of minimizing integration loss during switching is met with this configuration.

The astable multivibrator loop of FIG. 3 is AC coupled, fully symmetrical, and incorporates an RC circuit of R36, C34 to provide balanced hysteresis at the input of the positive feedback loop. The amount of hysteresis used is the minimum amount required to prevent mutual conduction of the diodes D33 and D34 near the switching point. This astable multivibrator is a unique configuration and is particularly suitable for implementation with four very high frequency transistors in discrete or integrated circuit form. The unity gain follower amplifiers buffer the differential output signals to provide a very low and broadband output impedance which minimizes the feed-thru of input signal to output as in criterion C above. Levels of −50 dBc are easily achievable with single transistor output followers. The low output impedance also results in nearly perfect integration of the signal current by capacitors C31 and C32 at nodes $e_{i+}$ and $e_{i-}$. The advantages of this approach are wideband modulation response with minimal residual phase shift of the high frequency deviation peak of the modulator. Thus, to summarize, the output followers provide ideal low impedance drive for accurate signal integration, and minimal feed-thru of the input signal.

An inherent advantage of the circuit symmetry and differential output of this implementation is the cancellation of second harmonic distortion products over a very wide frequency range. The balanced output is converted to a single ended matched RF source using the source matching resistors, $R_s$, and a wideband center tapped RF transformer. With this configuration, the modulator can be balanced for second harmonic levels better than $-50$ dBc over the full deviation range as desired to meet criterion C. This provides a large performance improvement over the previous art. A second advantage of the balanced output configuration is wideband output impedance match and wide output bandwidth. The modulator can be implemented with 500 mHz output bandwidth using conventional RF components with excellent VSWR over the modulator output signal bandwidth.

The center frequency or carrier frequency of the FM modulator is determined by the DC component of the input current from A31, the value of C31, C32, and the peak to peak output voltage of the astable circuit at $e_o +$ and $e_o -$. Thus, it is possible in this implementation to control all three parameters with precision passive components such as to achieve $\pm 5\%$ frequency stability as desired in criterion D. Since the integration is accomplished primarily in the current mode with current a linear function of the input signal, the FM modulator 5 can be deviated linearly over several octaves as described in criterion A.

The described FM modulator is suitable for implementation with a small number of RF transistors in discrete, hybrid, or monolithic form. The modulator has been implemented in hybrid form with circuit configuration of FIG. 3 such as to meet the criteria A through D. For this particular implementation, the wideband transconductance amplifier (A31) can be implemented with a grounded base RF transistor stage, Q31. Current source $I_B$ biases Q31 for higher quiescent current in order to achieve very wide linear current deviation at the input to the diode bridge, D31-D34. The astable multivibrator loop is implemented with four RF transistors, Q32-Q35. Transistors Q32 and Q33 implement the limiting amplifier which is current driven from bias source $I_{B2}$. The network C34 and R36 provide a balanced hysteresis voltage at the inputs of Q32 and Q33. Q32, Q33 form an n-p-n emitter coupled astable multivibrator. Capacitor C33 provides emitter coupling and maximum high frequency gain for rapid switching. Switching times of one nanosecond or less can be realized with this implementation. Transistors Q34 and Q35 are wideband voltage followers (A33 and A34) which provide for a wideband output match to the load, $R_L$, via the balanced RF transformer. Balance resistor $R_{43}$ enables wide range minimization of second harmonic distortion.

The voltage waveforms for key nodes A through E, for typical operation with a constant input signal, are shown in FIG. 4.

The following are examples of component values and selection for specific components in a 16 mHz (center frequency) hybrid realization of the modulator of this invention.

| C31 | = 47pF | |
| C32 | = 47pF | |
| C33 | = 100pF | speed-up capacitor |
| D31-D34 | = 1N5165 | hot carrier diodes |
| Q32, Q33 | = 2N3960 | RF NPN transistors |
| Q34, Q35 | = 2N3960 | |

WRITING AMPLIFIER 7

Referring to the block diagram of FIG. 5 and the waveforms of FIG. 8, the write input signal is split into 180° phases using a wideband RF transformer whose input load impedance is matched to the source. The input signal at A42 and A43 is a wideband modulated square wave. The differential input is buffered with unity gain voltage followers in order to provide low output drive impedance to the differential limiting amplifier, A41 and to isolate the source from the non-linear input impedance of A41, resulting in low distortion. The follower outputs, FIG. 8b and FIG. 8c, are balanced in level so as to achieve symmetrical switching and full clipping of the limiting amplifier A41 with 20-30 dB limiting ratio. The differential output currents, FIG. 8d and FIG. 8e, are then partially combined in an adjustable current balance matrix summing device incorporating unity current gain summing amplifiers to produce the differential output currents FIG. 8f and FIG. 8g. These currents are then effectively summed again in the output load to produce a symmetrical bipolar signal. The current balance matrix, is novel in this class of applications.

FIG. 6 shows a particular implementation of the write amplifier configuration. This implementation has been shown to meet the criteria A and B above. When implemented with high frequency RF transistors, the driver is capable of up to 500 mHz output bandwidth into some loads with better than 0.3 n sec phasing accuracy from input to output. Transistors Q41 and Q42 are used to implement the wideband, unity gain voltage followers A42 and A43. Transistors Q43 and Q44 comprise the limiting amplifier A41. The drive amplitudes at FIG. 6b and FIG. 6c are large enough to totally switch the current from the emitter current source between output collectors FIG. 6d and FIG. 6e. The cascode transistors, Q45 and Q46, serve as current summing amplifiers and output current drivers, providing the most accurate wideband current summing achievable while minimizing the need for voltage gain at the collectors of Q43 and Q44.

An alternate method of achieving the current amplitude balance adjustment, as shown in FIG. 9, consists of implementing a small variable differential current bias to the current summing nodes (i.e., emitters of Q55 and Q56). This method has the slight disadvantage that the amount of offset current is fixed and does not vary proportionally to the total current amplitude determined by source Icc. For the discussed configuration, the ratio of offset to total amplitude is constant (i.e., fixed imbalance compensation).

The following are examples of component values and selection for the writing amplifier 7 of the present invention.

| Q41, Q42 | 2N 3866 |
| Q43, Q44 | 2N 5108 |
| Q45, Q46 | 2N 4428 |

-continued

| | |
|---|---|
| R41 R42 | = 22 |
| R43 R44 | = 82 |
| R45 | = 1K |

DRIVER 9

Referring to the discriminator block diagram, FIG. 10, the FM signal is used as the input to a wideband balanced limiter at 10A. This circuit is constructed of several balanced differential amplifiers which add enough gain to the signal to output a current square wave at 10B. For wideband demodulation, the current waveform rise time at 10B must be no greater than a few nanoseconds over the entire range of input signal amplitude variations. The current waveform spectrum at Point 10B is illustrated in FIG. 11A. Note that only odd harmonics of the fundamental carrier spectrum are present here, if the circuit is balanced well. If adequate balance is not achieved, primary Moire distortion is added to the fundamental baseband signal as depicted, due to presence of the second harmonic spectrum.

The transformer at Point 10B in the block diagram fulfills two critical roles in wideband FM demodulation. It provides the necessary AC coupling between the limiter and the full wave rectifier. Circuit balance, important for discriminator performance, is achieved by using a transformer in a double ended, balanced configuration. In addition to this function, the transformer also performs the differentiation necessary for wideband FM demodulation. The result is a simple, efficient circuit which adds a minimum of parasitics to the discriminator. Parasitics in conventional approaches can be very detrimental to wideband circuit performance. To our knowledge, the integration of these two functions into this simple balanced configuration has not been used in previous pulse type discriminators.

The voltage waveforms at 10B and 10C are the time derivatives of the current square wave output from the limiter. The spectra of these waveforms, illustrated in Figure 11B, contain higher harmonic content than the spectrum of the limiter output current. This characteristic "widebanding" effect of the differentiation process reinforces the necessity for a cuircuit which exhibits good broadband even harmonic suppression. The configuration of FIG. 10 achieves the low levels of second harmonic required to meet criteria B and C above.

The differentiated pulses present at 10C are applied to the input of a balanced full wave rectifier through two buffer amplifiers with voltage gains of unity. The high input impedance of these amplifiers prevents the effects of nonlinear rectifier impedance mismatch from unbalancing the discriminator while their low output impedance allows the necessary currents to be supplied to the rectifier. The excellent performance of this wideband discriminator circuit, especially in terms of reduced Moire distortion, is not possible without the additional complexity of these amplifiers. The spectrum at 10D is essentially the same as at 10B and 10C.

The combination full wave rectifier and baseband filter which follows these amplifiers form an amplitude detector. The spectrum at 10E, FIG. 11C, is the convolution of the spectrum at 10D with the spectrum of an identically frequency modulated square wave. The output signal at 10F, FIG. 11D, is the desired baseband signal with the higher frequency components present at 10E removed by a low pass filter.

This circuit configuration satisfies the demanding requirements placed on the discriminator in wideband, low carrier frequency FM systems. This pulse type discriminator gives excellent linearity over several octaves of bandwidth. In conventional implementation of low carrier frequency FM systems where phase-shift discriminators have been employed, the frequency deviation of the modulated signal has been restricted in order to remain within the linear operating range of the phase-shift characteristic. System signal-to-noise performance has been sacrificed therefore, in order to use this highly popular discriminator circuit. The novel balanced, differentiating transformer coupled discriminator described herein achieves superior second harmonic suppression over a wide bandwidth, minimizing primary Moire distortion. The carrier suppression capability of this new discriminator circuit can be made better than 50 dB relative to the doubled carrier at 10E due to the balanced arrangement of the full wave rectifier and the amplifiers that drive it. Secondary Moire distortion is also minimized, since carrier feedthru is also reduced significantly relative to conventional discriminators.

A particular circuit implementation of this novel discriminator is shown in FIG. 12. Note that balanced circuit configuration is maintained throughout the discriminator form the input transformer T71 to the full wave rectifier output at R80. The input FM signal is differentially amplified in the wideband limiter. A current square wave with rise and fall times of a few nanoseconds is output from the limiter into the simple high pass filter formed by T72 and Resistors R72, R73, R74 and R75. The time constant of this circuit is short enough to form non-interferring voltage pulses over the entire system bandwidth. Transformer T72 also provides balanced AC coupling between the limiter and the voltage follower amplifiers, Q71 and Q72. These simple emitter followers prevent mismatch in the rectifier input impedance and loss of balance which has been so carefully maintained up to this point. The inherent balance of this unique discriminator configuration greatly reduces the effect of primary Moire distortion on the baseband signal. Discriminator pulses are applied to the full wave rectifier at Q73 and Q76 through resistors R76 and R78, which provide high frequency damping. The rectifier, consisting of switching transistors Q73, Q74, Q75, Q76 and bias current source transistors, Q77 and Q78, is constructed in balanced form to minimize carrier feedthru and its associated secondary Moire distortion. Resistors R77 and R79, along with R82 through R90, from the discriminator bias network. Adjustment at R86 increases rejection of high frequency carrier feedthru secondary Moire distortion at the signal output.

Circuit adjustment for optimum balance and carrier suppression is easily accomplished. The spectrum is observed at Point E, and the circuit is adjusted for minimum carrier spectrum here. Both second harmonic distortion and carrier feedthru are minimized in one simple step. A circuit configuration less well conceived might require multiple spectrum observations and adjustment steps to arrive at the optimum setting.

In summary, the discriminator circuit described here renders superior performance in wideband low carrier frequency Fm systems. Improved performance with respect to linearity, second harmonic suppression and carrier suppression is realized through the unique utilization of a transformer as a balanced coupling differentiator. Voltage follower amplifiers positioned between the differentiator and the rectifier prevent mismatched non-linear input from degrading discriminator balance. Adjusting the circuit for optimum performance is accomplished in one simple step.

This circuit is simple, inexpensive, and can be implemented in discrete, monolithic, or hybrid form.

The following are examples of component values and selection for the discriminator 9 of this invention.

T72 differentiating transformer, i.e., 1:2 trifilar wound on T37-6 core.
Q73, 74, 75, 76=CA3049
Q71, Q72=RF, e.g., 2N2857
R76, R78=20
R80, R81=75
Baseband Filter—Allen Avionics video low pass (Low Pass <25 mHz)

To those skilled in the art to which the invention pertains many adaptations and modifications as well as applications of the same will occur. For example, it is presently known now to provide a high quality audio recording as for example, for stereo recording, utilizing digital techniques. A 25 mHz analog bandwidth provided by the present invention will support a digital data rate of up to 100 megabits per second which is far in excess of the 2 to 4 megabits required for high quality stereo recording. The 100 megabit per second capability will also accommodate a digital color television signal of 87 megabits per second multiplexed with a high quality stereo audio signal at 2 megabits per second. This example, which requires 89 megabits per second transmission, could be impressed into the 25 mHz analog bandwidth with the technique that is given herein. Thus, in an audio system a digital premodulator would be employed for digital encoding of the stereo information so that it appears as a baseband video signal to the modulator of the present invention which then handles it as disclosed. By employing a premodulator and a decoder, the system is directly used for such purposes. An example would be a PCM audio digitizer which converts the digital audio signal into a video signal bandwidth acceptable by this system.

A fiber optic, high resolution video transmission system using the present invention will now be set forth with reference to FIG. 13. Thus, the modulator and signal generator 105, writing amplifier 107 and limiter-discriminator 108, 109 circuits disclosed herein are suitable for electro-optical analog signal video transmission systems of bandwidth of 25 mHz or more and signal-to-noise ratios of greater than 50 dB. The present invention in fact offer advantages of circuit simplicity and miniaturization of components, wide band performance, and drive compatibility with available fiber optic components and has many advantages in rejecting electrical disturbances from power lines, rail surges, etc., and possesses lower transmission loss than metal cable. It is lightweight, thin and easy to install. In addition, the fiber optic cable system is free from cross talk. The configuration has applications is distributing high resolution video signals to multiple stations in centralized systems, for example, medical image communication systems and video conferencing systems. FIG. 13 shows the fiber optic high resolution transmission system which can be implemented with the present invention coupled with off-the-shelf fiber optic components.

Referring to FIG. 13, the video FM modulation system produces an FM square wave signal whose transitions (in other words the zero crossings of the FM signal) contain all the information of the baseband video signal, just as described previously. The writing amplifier 107 produces a very symmetrical high current drive signal which is coupled via a wide band differential transformer 121 to an infra-red optical laser diode 122; for example, the Motorola MFOE 103F or the Fujitsu equivalent. The carrier fiber optics 123 are Corning SDF DWF/FWF or Hewlett Packard HPHFSR-308.

The writing amplifier 107 produces a current drive signal with symmetrical pulses corresponding to the FM signal zero crossings. The position of the pulses correspond directly to the modulated baseband information. The light pulses travel through the fiber optic cable and are converted to electrical pulses at the receiver by an avalanche diode detector 124, for example the Motorola MFOE 402F or the Fujitsu equivalent and passed through a suitable low noise preamplifier 126. The pulse positions are then filtered and converted back to a replica of the transmitted FM square wave signal and demodulated by the limiter-discriminator circuit 108/109 discussed previously. The DC component of the baseband video signal is typically required to be restored by a DC restoration circuit 128 at the output as a result of the DC carrier component present at the demodulator output for this type of discriminator. The modulator and signal generator 105, the writing amplifier 107 and limiter-discriminator circuit 108/109 correspond directly to those set forth in connection with FIGS. 1 through 12 as circuits 5, 7, 8 and 9, respectively. The FM signal zero crossings as they appear at the input to the PN diode 122 serve to turn the same on and off completely so that a narrow pulsed light output occurs with the light pulses isolated from each other during transitions of the signal wave form. The overall system, including disclosed inventions, can thus be implemented with low complexity, low cost and a small component size.

The components used in this embodiment are summarized here for completeness:
Modulator and Signal Generator 105— as disclosed.
Writing Amplifier 107 — as disclosed.
Wide Band Transformer 121 — as available.
PN Diode Emitter 122 — Motorola MFOE 103F or Fujitsu PN Laser Diode.
Optical Fiber Transmission Line 123 — Corning DWF/SDF/FWF or Hewlett-Packard HFBR-3000.
Optical Detector 124 — Motorola MFOE 402F or Fujitsu Avalanche Diode.
Preamplifier 126 — Motorola MC1733.
Limiter/Discriminator 108/109 — as disclosed.
DC Restore 128 — as available.

We claim:

1. In a video recording system including a source of video signals, a recording medium, means for impressing a recoverable signal on said medium, the improved signal processing circuits comprising a modulator for a single conversion of an input wide band video signal into a wide band FM signal at low frequency, a writer for amplifying said FM signal and for driving said impressing means, a demodulator for receiving the recorded signal and for converting back into a video signal corresponding to the original, said modulator comprising a differentially driven astable multivibrator for producing an equal interval square wave of a frequency controlled by said current source, a differential signal splitting network having a nanosecond switching response, a hystersis controlled circuit to reduce the crossover conductance and dead time between conductance states of said multivibrator to an arbitrarily small value so that the repetition frequency of said square wave is single valued and modulated by said video signal.

2. In a video recording system including a differential writing transducer load constructed and arranged for writing upon a recording medium, a source of video signal, a wide band FM modulator for converting said video signal into a wide band FM signal, a writing amplifier for accurately driving said load from said wide band FM signal and including a wide band RF transformer for receiving said FM signal and dividing the same into a balanced differential signal, a unity gain voltage follower for providing buffer amplification to said differential signal and having a low output drive impedance for isolating the source from the input impedance of following stages, a limiting differential amplifier capable of being driven to full clipping by said voltage follower circuits, means disposed between said voltage follower and said differential amplifier for controlling the switching phase balance and for maintaining the switching phase accuracy thereof and comprising an adjustable current balance matrix for partially combining the output of said limiting differential amplifiers and including means for adjusting the current amplitude balance thereof, and unity gain current summing amplifiers connected to the output of said controlling means for producing a symmetrical bi-polar signal in said load.

3. In a video transmission recording system including a differential writing transducer constructed and arranged for writing upon a recording medium, a source of video signal, an FM modulator for converting said video signal to a wideband square wave signal having a precise, single value repetition frequency, a writing amplifier for accurately driving a said transducer with said square wave signal comprising a wideband RF transformer for receiving said FM signal and dividing the same into a balanced differential signal, a unity gain, differential voltage follower, buffer amplifier having a low power output drive impedance for isolating the source from the input impedance, a differential phase adjuster for precisely adjusting the zero crossings of the output signal from said voltage follower to maintain a single valued repetition frequency thereof as a function of the input FM signal, a pair of limiting differential amplifiers drivable to full clipping, an adjustable current balance matrix connected across the outputs of said differential amplifiers for partially combining the outputs of said differential amplifiers to accurately adjust the output level balance therefrom, a unity gain current summing amplifier connected between said matrix and said load and in cascode with said limiting amplifier output for producing a symmetrical bi-polar signal in said transducer.

4. In a video reproducing system in which a video signal is converted into a wideband FM signal and impressed upon a medium, a discriminator for receiving the signal from said medium and converting it into a video signal corresponding to the original comprising a wideband balanced pulse discriminator including means forming a wideband balanced limiter amplifier to convert signals into a current square wave a balanced transformer coupled to the output of said limiting amplifier and connected in a double-ended, balanced configuration to also form a high pass filter for differentiating said current square wave signal to produce a wideband FM demodulated signal, a full wave rectifier connected to the output of said transformer to derive a video signal therefrom, a balanced voltage follower circuit for driving said rectifier, and a baseband filter for eliminating frequencies above the video baseband from the output of said rectifier.

* * * * *